United States Patent
Tsai

(10) Patent No.: US 7,187,152 B1
(45) Date of Patent: Mar. 6, 2007

(54) AC SERVO DRIVE WITHOUT CURRENT SENSOR

(75) Inventor: Chin-Shiong Tsai, Taoyuan Hsien (TW)

(73) Assignee: Delta Electronic Inc., Taoyuan (TW)

( * ) Notice: Subject to any disclaimer, the term of this patent is extended or adjusted under 35 U.S.C. 154(b) by 0 days.

(21) Appl. No.: 11/249,420

(22) Filed: Oct. 14, 2005

(51) Int. Cl.
*B25J 15/02* (2006.01)
*G05B 19/408* (2006.01)

(52) U.S. Cl. ............ 318/568.21; 318/138; 318/254; 318/439; 318/608; 318/609; 318/700; 318/721; 318/722; 318/599; 318/799; 318/801

(58) Field of Classification Search ........... 318/138, 318/254, 439, 599, 432–434, 560–650, 700–812
See application file for complete search history.

(56) References Cited

U.S. PATENT DOCUMENTS

| | | | | |
|---|---|---|---|---|
| 3,906,315 A | * | 9/1975 | Gotisar | 318/761 |
| 4,456,868 A | * | 6/1984 | Yamamura et al. | 318/800 |
| 5,089,761 A | * | 2/1992 | Nakazawa | 318/811 |
| 5,134,354 A | * | 7/1992 | Yamamoto et al. | 318/609 |
| 5,469,215 A | * | 11/1995 | Nashiki | 318/432 |
| 5,965,995 A | * | 10/1999 | Seibel et al. | 318/805 |
| 6,208,109 B1 | * | 3/2001 | Yamai et al. | 318/716 |
| 6,590,358 B1 | * | 7/2003 | Tsutsui | 318/560 |
| 7,026,779 B2 | * | 4/2006 | Eba | 318/609 |

* cited by examiner

*Primary Examiner*—Lincoln Donovan
*Assistant Examiner*—Tyrone Smith

(57) ABSTRACT

An AC servo drive without current sensor includes a PI (proportional integration) controller, at least two first-order controllers (polar point and zero point), a decoupling compensator, a coordinate converter, a pulse width modulator, a counter and a speed estimator. The AC servo drive is connected with a servomotor to form an AC servo module. The servomotor comprises an encoder receiving a current command signal from the servo module to function as input current command signal or the d, q axes PI controller and the decoupling compensator. The voltage command signal generated by the d, q axes PI controller and the signal generated by the decoupling compensator form a control signal and input to the coordinate converter. The signal output from the coordinate converter is processed by PWM controller to control the servomotor. Therefore, the deterioration of servo motor control caused by temperature drift and cost can be solved.

5 Claims, 8 Drawing Sheets

AC SERVO DRIVE WITHOUT CURRENT SENSOR

BACKGROUND OF THE INVENTION

1. Field of the Invention

The present invention relates to an AC servo drive without current sensor, especially to an AC servo drive without current sensor using open loop circuit control and using current command received by encoder in servomotor as feedback current signal, thus being used in linear servo motor operation.

2. Description of Prior Art

FIG. 1 shows a prior art AC servo module comprising an AC servo driver 1 connected to a servomotor 2. The servomotor 2 comprises an encoder (not shown). The AC servo driver 1 comprises a first PI (proportional integration) controller 11, a second and a third PI controllers 12, 13 for d and q axes, a first coordinate converter 14, a pulse width modulator 15, a plurality of current sensors 16 with three phase connection, a second coordinate converter 17, a decoupling compensator 18, a counter 19 and a speed estimator 20, wherein the coil transformation function $(s)=1/(Ls+R)$, where Ls indicates an inductance for the coil and R indicates resistance for the coil.

In above-mentioned AC servo driver 1, the decoupling has relationship only with the magnetization current Id, the torque current Iq and angular speed w. The decoupling compensator 18 keeps in action and the stator system can be simplified as FIG. 2. The relationship for the second and the third PI controllers 12, 13 for d and q axes, the coil transformation function $(s)=1/(Ls+R)$ for the servomotor 2 is shown. The servomotor 2 obtains the feedback for the stator current, the magnetization current Id, the torque current Iq and uses decoupling current instruction signal Id* and Iq* as the input current command signal for the second and the third PI controllers 12, 13 of d and q axes.

FIG. 3 shows the frequency response of the prior art AC servo module in FIG. 1 and a 3 KW, 2000 rpm motor is used to drive a load of five times initia. The curve A in upper portion of FIG. 3 is a speed command and the curve B is actual output speed. The curve C in lower portion of FIG. 3 is Iq command and the curve D is feedback current. Because the current sensor will sense the feedback current, the curves C and D will be very close.

In above-mentioned prior art AC servo module, the servomotor 2 receives current command signal through the encoder thereof and provides an initial angle for rotator such that the AC servo driver 1 generates a stator current vertical to the rotator magnetic field. The input voltage, the current and rotation speed of the permanent magnetic servomotor 2 are nonlinear, the sensors 18 detect the three-phase current of the servomotor 2 and feedback the three-phase current for decoupling and providing linearization. The feedback scheme for decoupling is important in advanced AC servo architecture. The conventional current sensor generally adopts Hall-effect element to detect stator current in high power AC servo device. However, the Hall-effect element has drift property with temperature, namely, the measurement is increased as temperature is increased. Moreover, a plurality of current sensors is needed for obtaining three-phase current. The feedback current is converted through the second coordinate converter 17. Therefore, it is difficult to cost down in the manufacture and maintenance of this device.

SUMMARY OF THE INVENTION

The present invention provides an AC servo drive without current sensor using open loop circuit control and using current command received by encoder in servomotor as feedback current signal. The AC servo drive still has decoupling effect even the current sensor is removed. Therefore, the deterioration of servo motor control caused by temperature drift and cost can be solved.

Accordingly, the present invention provides an AC servo drive without current sensor, the AC servo drive used in an AC servo module and performing vector control for servomotor with decoupling function. The AC servo drive comprises a servomotor comprising a built-in encoder;

at least two first-order controllers using current feedback signal generated by the servo module as input current command signal for d, q axes and generating output voltage command signals;

a decoupling compensator using current feedback signal generated by the servo module as feedback current for decoupling and providing an decoupled and compensated control signal with the output voltage command signals;

a coordinate converter performing d, q coordinate conversion for the decoupled and compensated control signal;

a pulse width modulator receiving the coordinate-converted signal for generating a PWM signal and then sending the PWM signal to the servomotor for generating a rotational torque;

a counter connected to the encoder and outputting the angle speed measurement signal for using as trigging timing signal of the coordinate converter and the PWM controller and an input signal for the speed estimator;

a speed estimator estimating rotation speed of the servomotor based on the angle speed measurement signal of the counter and outputting an angle feedback signal to the decoupling compensator and forming a command signal for the PI controller with an angle speed command signal w of the servo module.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 4:
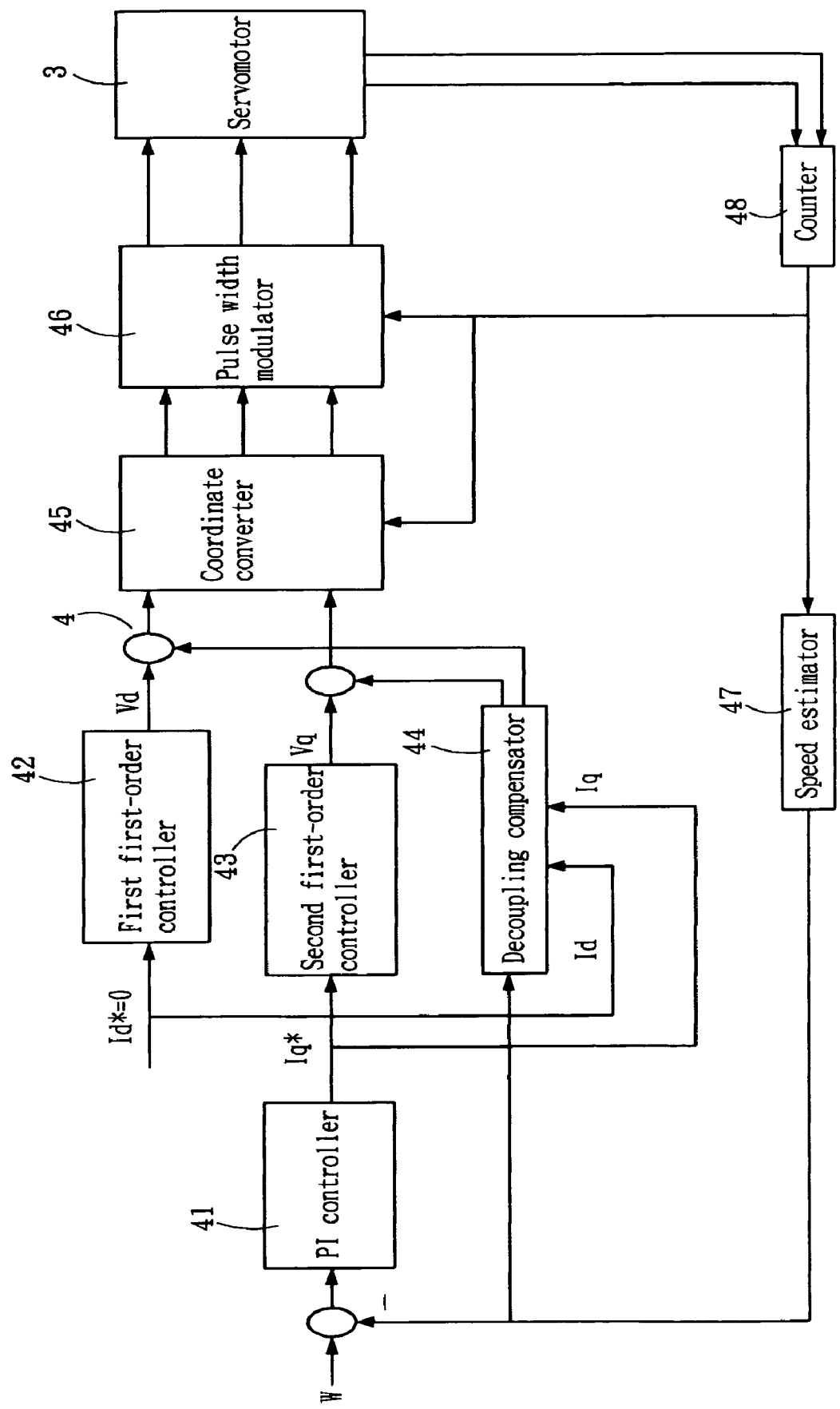
FIG. 4 shows a block diagram of the AC servo drive without current sensor according to the present invention in speed mode.

FIG. 4 shows a block diagram of the AC servo drive without current sensor according to the present invention. The AC servo drive according to the present invention comprises a servomotor 3 and an AC servo drive 4 connected to the servomotor 3. The AC servo drive 4 comprises a PI (proportional integration) controller 41, a first and a second first-order controllers 42, 43, a decoupling compensator 44, a coordinate converter 45, a pulse width modulator 46, a counter 47 and a speed estimator 48 to form an open-loop current circuit. A feedback speed is generated for speed error by the speed command and the encoder (not shown) in the servomotor 3. The current command signal is produced by the PI controller 41 to directly provide feedback current for decoupling such that the current circuit still has decoupling function even without current sensor. The deterioration of servo motor control caused by temperature drift and cost can be solved.

The encoder in the servomotor 3 is an angle encoder such as one of resolver and photo commutation, which is used to measure the absolute position or relative position of the rotator and produce an angular speed measurement signal to the driver circuit.

The PI controller 41 is current converter and receives a command signal formed by the angular speed signal of the servo module and the rotation speed feedback signal from the speed estimator 48. The command signal is converted by the PI controller 41 and then the PI controller 41 sends a torque current command signal Iq* feedback by the encoder of the servomotor 3.

The first and the second first-order controllers 42, 43 are used for voltage conversion of vertical d, q axes, wherein the first first-order controller 42 receives a current command signal from the servo module and a current feedback signal is produced by encoder built-in the servomotor 3 to function as input magnetization command signal Id*. Moreover, the output voltage signal Vd, Vq are also generated. The second first-order controller 43 receives the torque current command signal Iq* from the PI controller 41.

The decoupling compensator 44 uses a current command signal of the servo module and the decoupling current signal from the built-in encoder of the servomotor 3 as feedback current required for decoupling, which comprises magnetization current signal Id and torque current signal Iq. The output signal of the decoupling compensator 44, together with the voltage command signals of the first and the second first-order controllers 42, 43, provide a control signal for decoupling compensation.

The coordinate converter 45 uses above d, a axes control signal for decoupling compensation in order to convert the d, q axes coordinate to three-phase voltage command and the three-phase voltage command is output to the pulse width modulator 46. The pulse width modulator 46 modulates the three-phase voltage command for outputting to the servomotor 3 for producing rotational torque.

The counter 47 is connected to the encoder of the servomotor 3 to output angular speed measurement signal, which is used as trigging timing signal for the coordinate converter 45 and the pulse width modulator 46 and the input signal for the speed estimator 48.

The speed estimator 48 estimates the speed of the servomotor based on the angular speed measurement signal of the counter 47 and outputs an angular feedback signal to the decoupling compensator 44 and forms a command signal for the PI controller 41 with the angle speed command signal w of the servo module.

Figure 5:
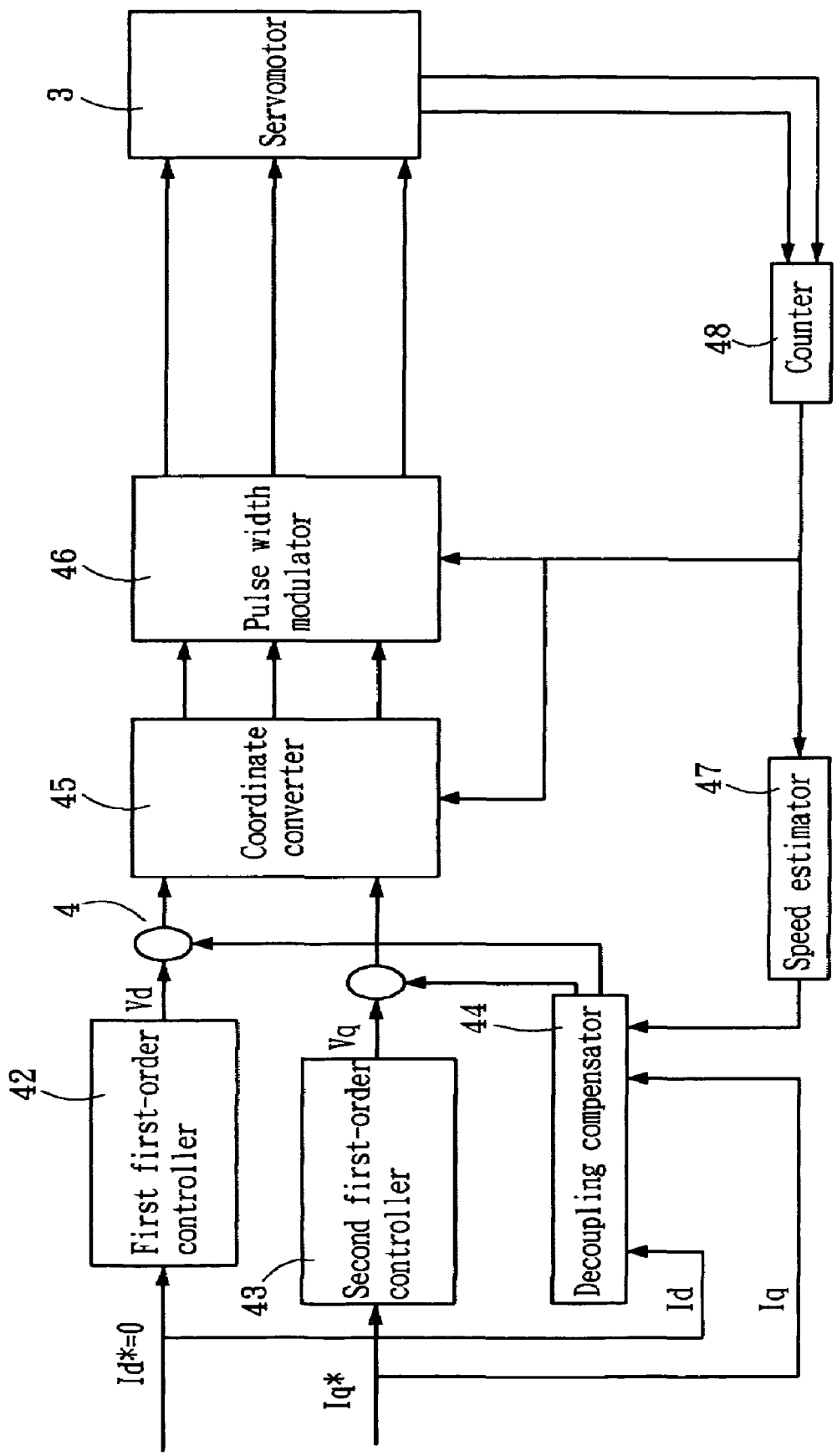
FIG. 5 shows a block diagram of the AC servo drive without current sensor according to the present invention in current mode.

FIG. 5 shows a block diagram of the AC servo drive without current sensor according to the present invention. The AC servo drive according to the present invention comprises a servomotor 3 and an AC servo drive 4 connected to the servomotor 3. The AC servo drive 4 comprises a first and a second first-order controllers 42, 43, a decoupling compensator 44, a coordinate converter 45, a pulse width modulator 46, a counter 47 and a speed estimator 48 to form an open-loop current circuit. Similarly, the current command signal of the servo module is processed into decoupling current signal by the built-in encoder of the servomotor 3, and the decoupling current signal comprises magnetization current signal Id and torque current signal Iq. The magnetization current signal Id and torque current signal Iq, as well as the angle speed feedback signal of the speed estimator 48 are processed to provide decoupling current signal. The decoupling current signal and the output voltage command signal Vd, Vq provide control signal for decoupling compensation and are input to the coordinate converter 45. The coordinate converter 45 generates a three-phase voltage signal and sends it to the pulse width modulator 46 for generating PWM (Pulse width modulation) signal. The PWM signal is send to the servomotor 3 for generating rotational torque.

Figure 1:
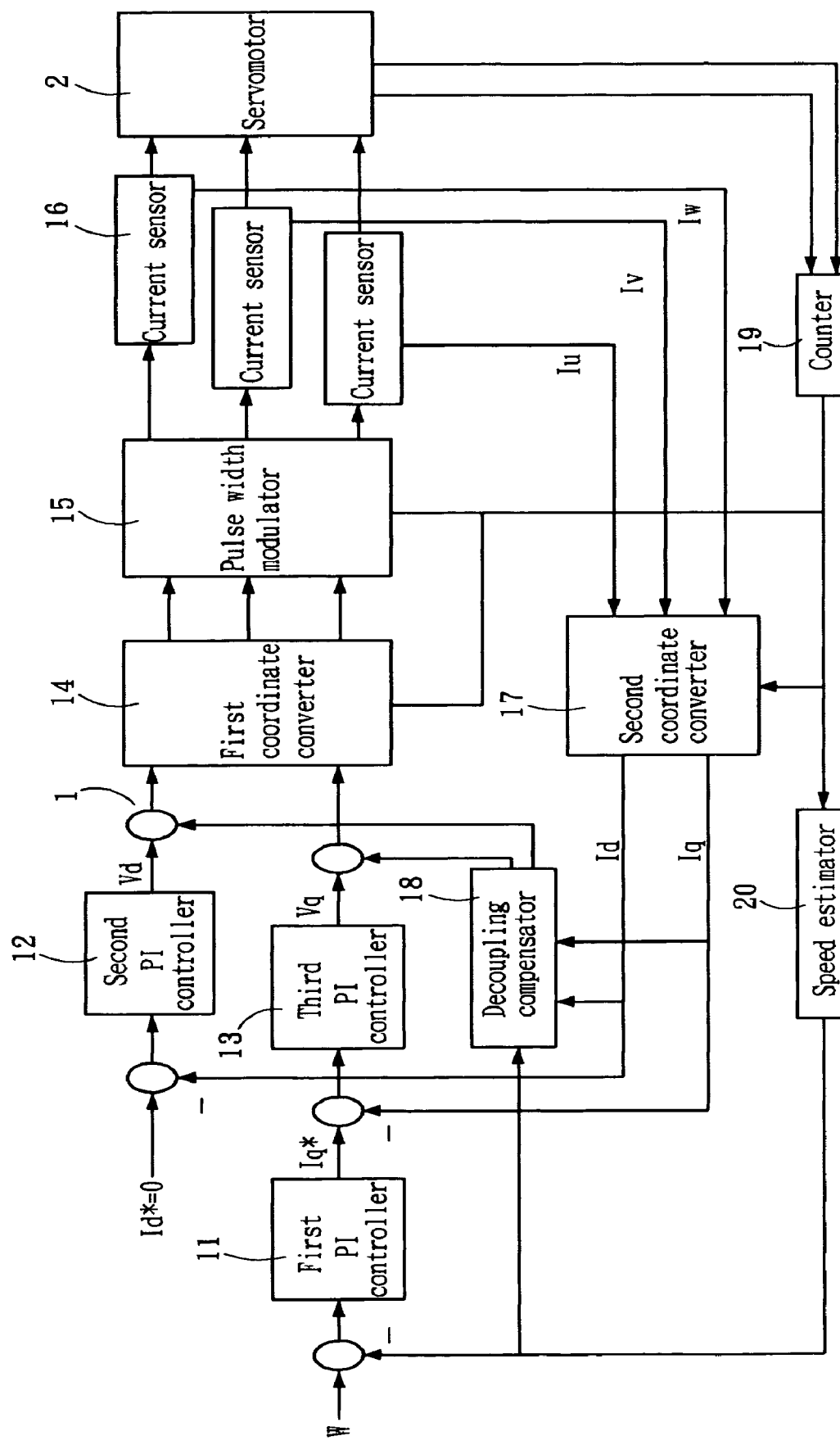
FIG. 1 shows a prior art AC servo module.
Figure 2:
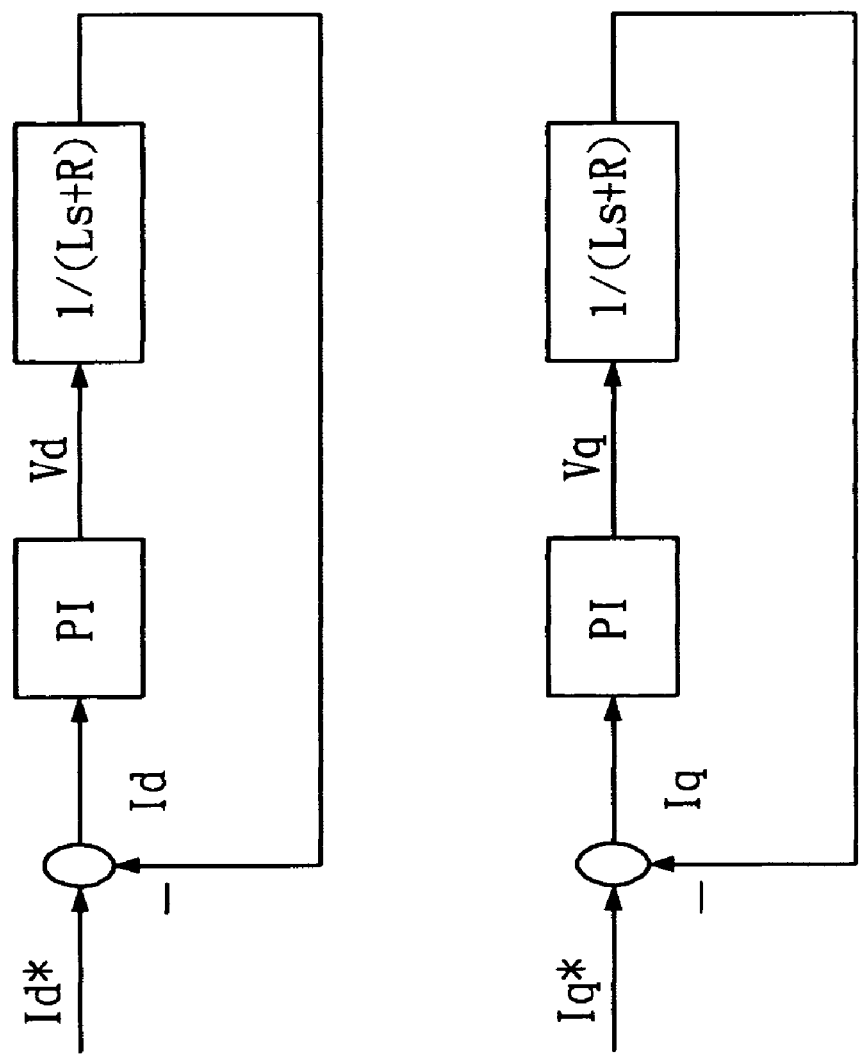
FIG. 2 shows a simplified block diagram for FIG. 1.
Figure 6:
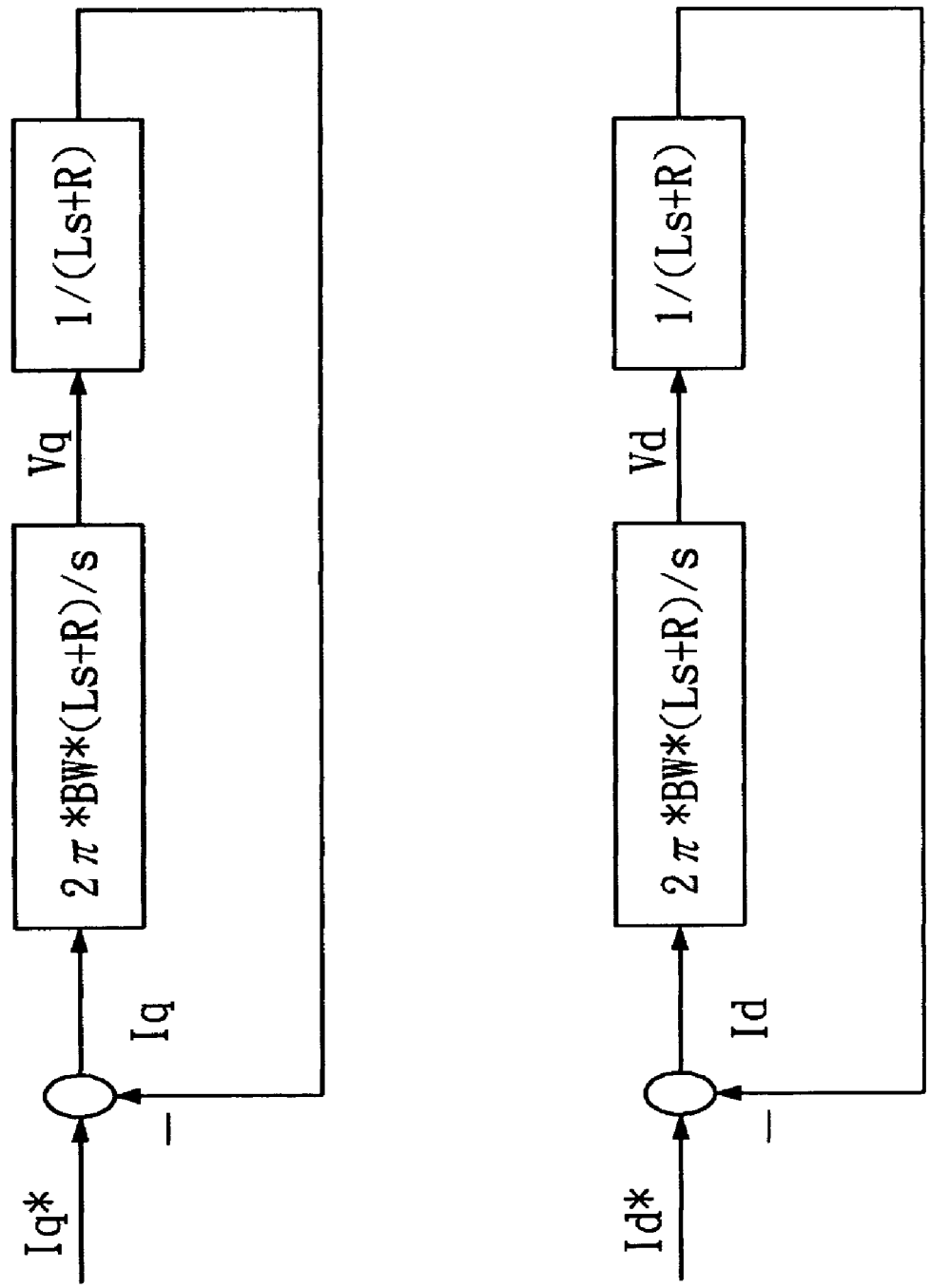
FIG. 6 shows a simplified block diagram for open loop condition.
Figure 7:
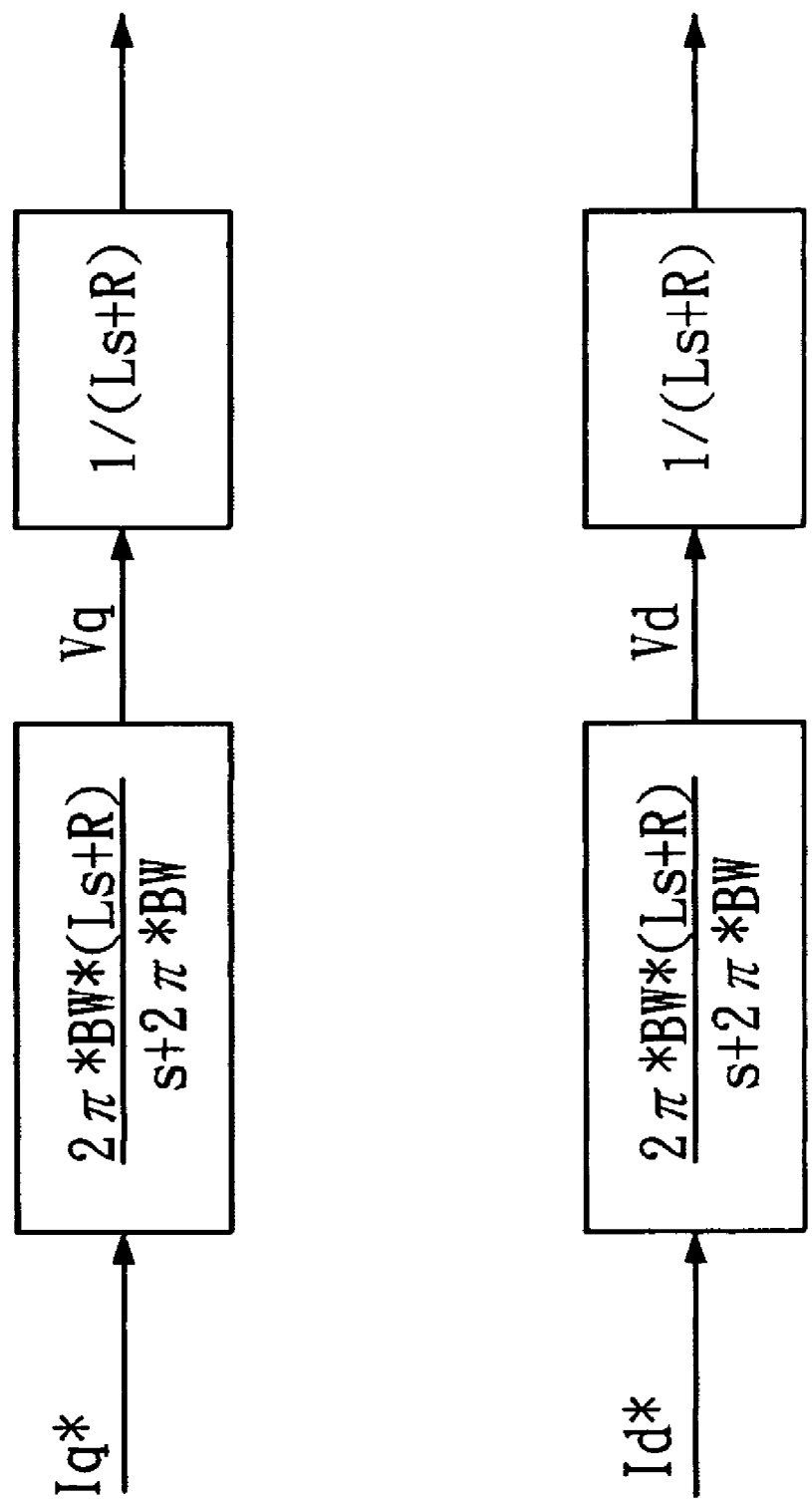
FIG. 7 is a further simplified block diagram for FIG. 6.

The AC servo drivers shown in FIGS. 4 and 5 do not need current sensor to feedback stator current signal and is directly controlled by open loop architecture. The built-in encoder in the servomotor 3 generates a feedback current. When the circuit shown in FIG. 1 requires open loop bandwidth of BW (Hz), the second and the third PI controllers 12, 13 for d and q axes are set as $2\pi*BW*(Ls+R)/s$. In this way, the block diagram shown in FIG. 2 can be simplified to the block diagram shown in FIG. 6, wherein the second and the third PI controllers 12, 13 for d and q axes set as $2\pi*BW*(Ls+R)/s$ and the coil transfer function $(s)=1/(Ls+R)$ are involved. Moreover, due to the saving of the current sensor, the inductor L and resistor R of the servomotor 3 will not be deteriorated with increased temperature. The second and the third PI controllers 12, 13 for d and q axes can be equivalent to $2\pi*BW*(Ls+R)/(s+2\pi*BW)$. As shown in FIG. 7, the second and the third PI controllers 12, 13 for d and q axes can be further equivalent to $2\pi*BW*(Ls+R)/(s+2\pi*BW)$, and the coil transfer function of the servomotor 3 is $(s)=1/(Ls+R)$, where no feedback stator current is involved.

Figure 3:
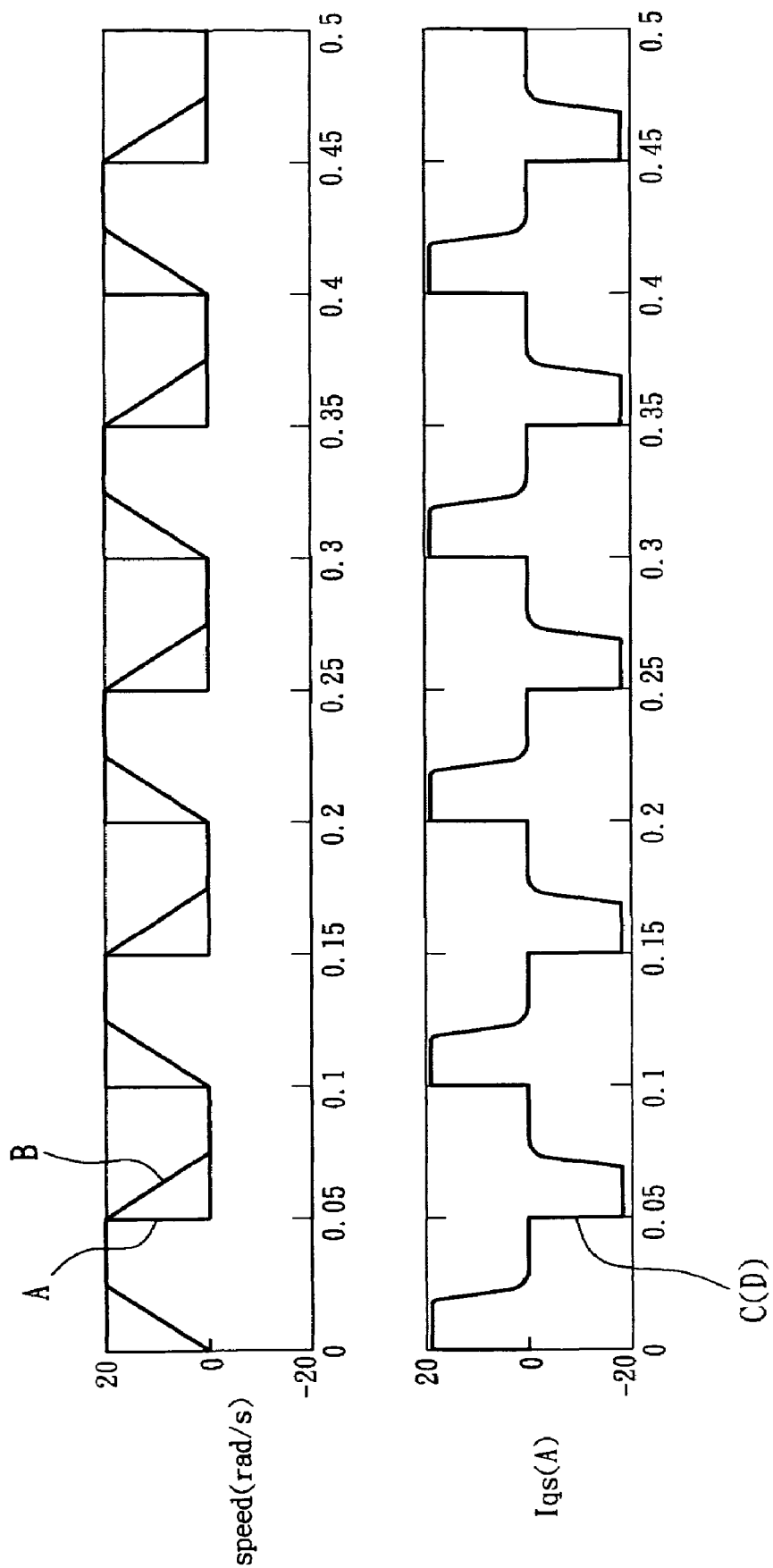
FIG. 3 shows the frequency response of the prior art AC servo module.
Figure 8:
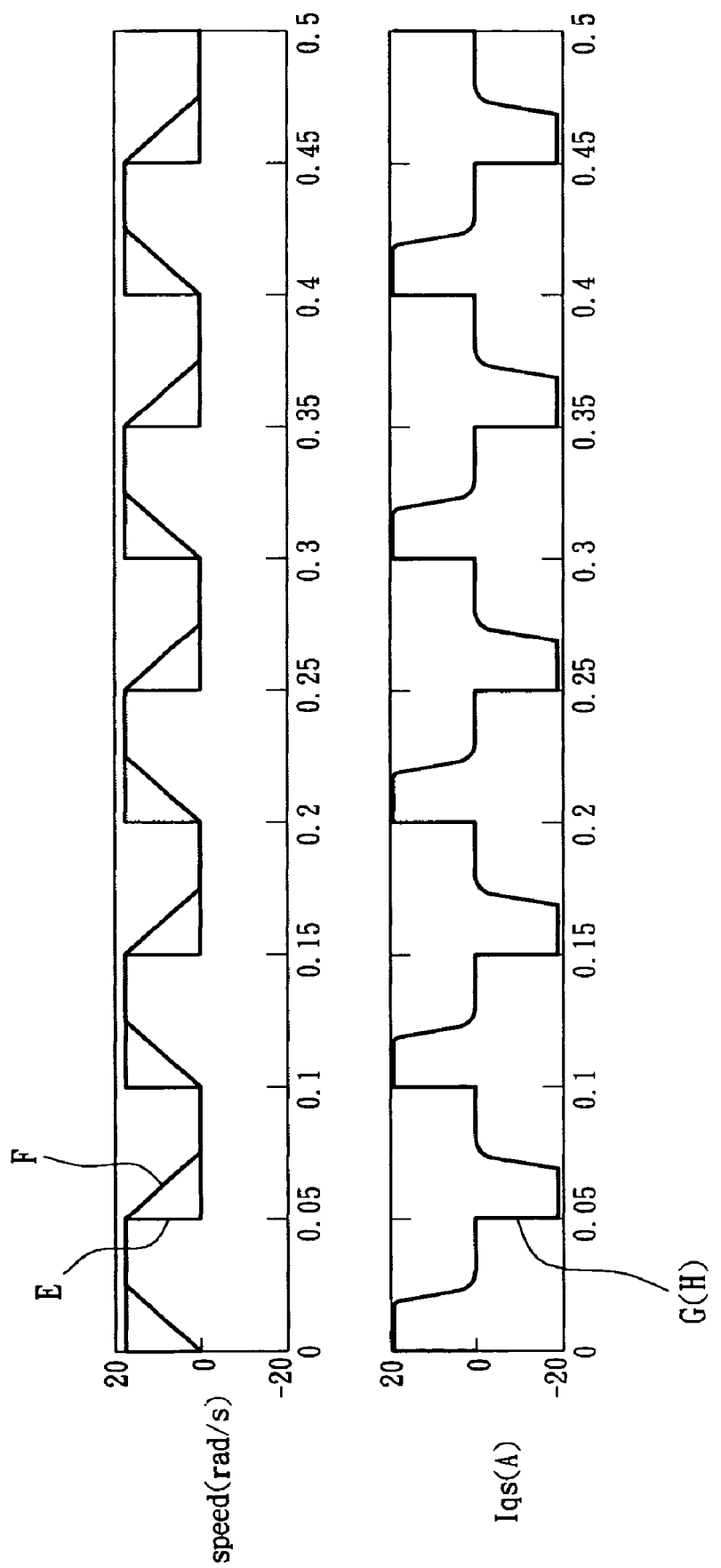
FIG. 8 shows the frequency response of the AC servo module of the present invention.

FIG. 8 shows frequency response of the AC servo module of the present invention, where a 3 KW, 2000 rpm is used to drive a load of five fold initia. In the lower portion of FIG. 8, the curve G is corresponding to Iq command and the curve H is feedback current. Therefore, the Iq command has slight difference with the actual current output. In the upper portion of FIG. 8, the curve E is speed command, the curve F is actual output speed, which are nearly identical with those shown in FIG. 3, where feedback stator current provided by sensor is involved. The resistors and inductors of the motor stator have slight difference, however, the speed circuit can be compensated.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An AC (alternating current) servo module without current sensor, comprising a servomotor and an AC servo drive connected to the AC servomotor, the AC servo drive comprising a PI (proportional integration) controller, at least two first-order controllers, a decoupling compensator, a coordinate converter, a pulse width modulator, a counter and a speed estimator to form an open-loop current circuit;

wherein a built-in encoder in the servomotor receives a current command signal and produces feedback current signal for decoupling by program control, the feedback current signal and an angle speed feedback signal of the speed estimator form a decoupling current signal, the decoupling current signal and voltage command signals Vd, Vq of the first-order controller of d, q axes form a decoupled and compensated control signal to the coordinate converter, the decoupled and compensated control signal being converted to three-phase voltage command and processed by the pulse width modulator into a PWM (Pulse width modulation) signal and the PWM signal is sent to the servomotor to generate a rotational torque.

2. An AC (alternating current) servo drive without current sensor, used in an AC servo module and performing vector control for a servomotor with decoupling function, the AC servo drive comprising:

a servomotor comprising a built-in encoder;

a PI (proportional integration) controller receiving a command signal formed by an angle speed command and a rotation feedback signal from a speed estimator and generates a torque current signal Iq* for feedback to q axis;

at least two first-order controllers using current feedback signal generated by the servo module as input current command signal for d, q axes and generating output voltage command signals Vd, Vq;

a decoupling compensator using current feedback signal generated by the servo module as feedback current for decoupling and providing an decoupled and compensated control signal with the output voltage command signals;

a coordinate converter performing d, q coordinate conversion for the decoupled and compensated control signal;

a pulse width modulator receiving the coordinate-converted signal for generating a PWM (Pulse width modulation) signal and then sending the PWM signal to the servomotor for generating a rotational torque;

a counter connected to the encoder and outputting the angle speed measurement signal for using as trigging timing signal of the coordinate converter and the PWM controller and an input signal for the speed estimator;

a speed estimator estimating rotation speed of the servomotor based on the angle speed measurement signal of the counter and outputting an angle feedback signal to the decoupling compensator and forming a command signal for the PI controller with an angle speed command signal of the servo module.

3. The AC servo drive without current sensor as in claim 2, wherein the encoder in the servomotor is an angular encoder and generating an angle speed sensing signal to the AC servo drive.

4. The AC servo drive without current sensor as in claim 3, wherein the angular encoder is a resolver or a photo commutation.

5. An AC (alternating current) servo drive without current sensor, used in an AC servo module and performing vector control for servomotor with decoupling function, the AC servo drive comprising:

a servomotor comprising a built-in encoder;

at least two first-order controllers using current feedback signal generated by the servo module as input current command signal for d, q axes and generating output voltage command signals;

a decoupling compensator using current feedback signal generated by the servo module as feedback current for decoupling and providing an decoupled and compensated control signal with the output voltage command signals;

a coordinate converter performing d, q coordinate conversion for the decoupled and compensated control signal;

a pulse width modulator receiving the coordinate-converted signal for generating a PWM (Pulse width modulation) signal and then sending the PWM signal to the servomotor for generating a rotational torque;

a counter connected to the encoder and outputting the angle speed measurement signal for using as trigging timing signal of the coordinate converter and the PWM controller and an input signal for the speed estimator;

a speed estimator estimating rotation speed of the servomotor based on the angle speed measurement signal of the counter and outputting an angle feedback signal to the decoupling compensator and forming a command signal for the PI controller with an angle speed command signal of the servo module.

* * * * *